Sept. 9, 1958     O. H. BANKER     2,851,012
CLOSED CENTER VALVE WITH BALL CHECK VALVES
Filed Oct. 4, 1956
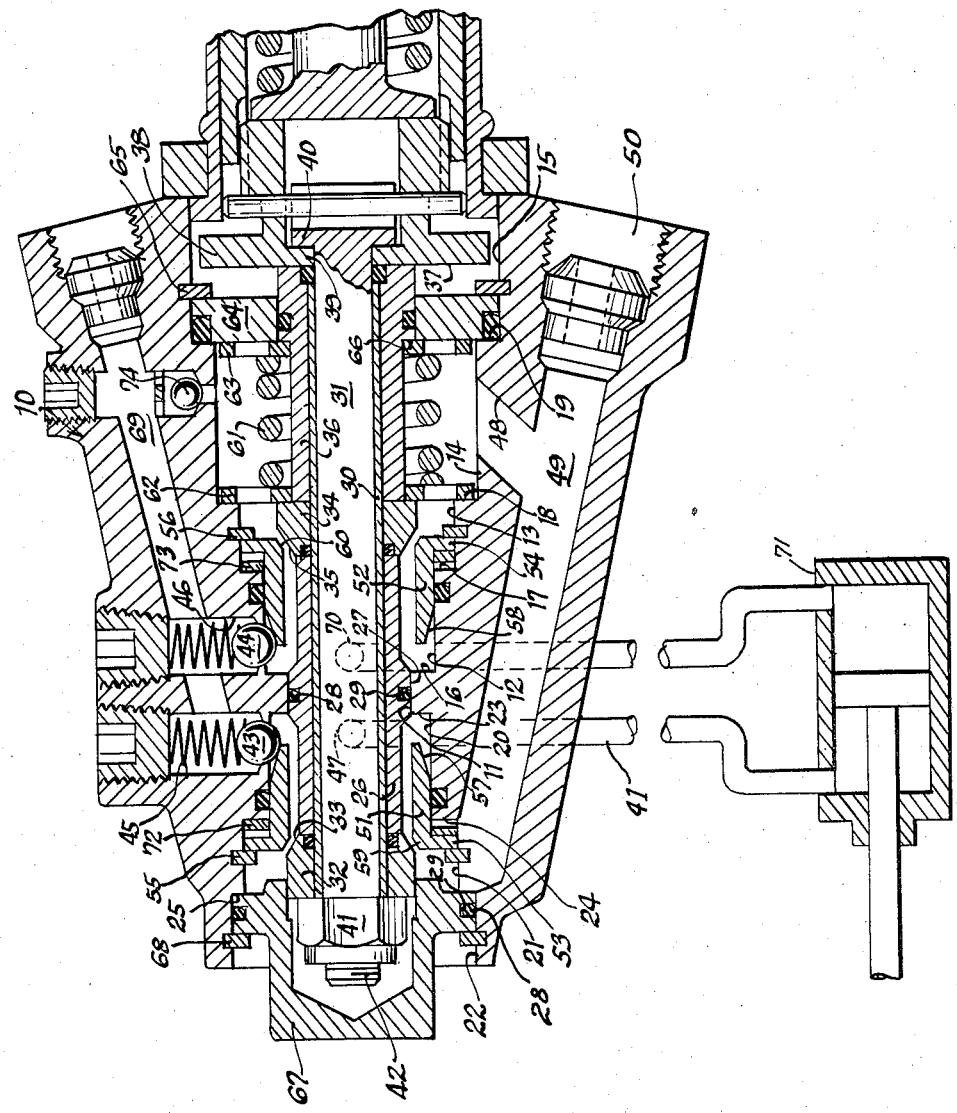
INVENTOR.
Oscar H. Banker
BY
Charles J. Vrtech
Attorney

2,851,012
CLOSED CENTER VALVE WITH BALL CHECK VALVES

Oscar H. Banker, Evanston, Ill., assignor to New Products Corporation, Skokie, Ill., a corporation of Delaware Application October 4, 1956, Serial No. 613,874

5 Claims. (Cl. 121—46.5)

This invention relates to valves for controlling the operation of double acting, fluid pressure power cylinders and will be described for purposes of illustration as applied to a valve for controlling the operation of a power steering mechanism for vehicles.

In view of the multiplicity of devices presently applied to vehicles for performing various operations requiring the application of energy thereto, it has been proposed to use a single source of energy, and then by the use of individual valves and conduits, to direct the energy to the devices. One of the devices proposed and presently widely used on vehicles is a power braking device which applies fluid pressure to the braking system of the vehicle under the control of a driver-operated brake valve. Since it is highly desirable that both power braking and power steering, for example, be available even though the vehicle engine may not be operating at the moment to energize the fluid for these devices, it becomes necessary to store the energized fluid in an accumulator and to conserve the energized fluid as much as possible.

As one means for conserving stored fluid under pressure, it has been proposed to use closed center valves for controlling the operation of the double-acting power cylinder components of the system. In these valves, fluid under pressure is conducted to a central distribution point and is then held there until there is a demand for it to operate one side or the other of the double acting cylinder. Such valves, as heretofore proposed, require the maintenance of extremely close tolerances in their manufacture to make certain that the co-operating valve parts will effectively seal off the pressure fluid source when there is no demand for pressure fluid.

It is accordingly an object of this invention to provide a valve for controlling the operation of a double acting fluid pressure cylinder which does not require the exercise of any precision manufacturing operations in its fabrication.

It is a further object of this invention to provide a fluid-tight control valve for a double-acting fluid pressure cylinder which provides a reaction to the means by which the valve is operated, the magnitude of the reaction being in proportion to the degree of movement of the said operating means.

As a specific object, this invention has within its purview the provision of a valve for a power steering mechanism, which valve will be inexpensive to make, but which will nevertheless function in the manner of a precision made closed center valve.

These and other objects of this invention will become apparent from the following description when taken together with the accompanying drawings in which the sole figure is a section through a preferred embodiment of the invention.

For purposes of illustration the valve of this invention will be described with reference to its use in a power steering mechanism for automotive vehicles.

Referring now to the drawing, the valve is comprised of a body 10 having a short bore 11 and first, second, third and fourth counterbores 12, 13, 14 and 15, respectively, of progressively increasing diameters to the right of bore 11 as viewed in the drawing. Said counterbores form shoulders or abutments 16, 17, 18 and 19 of generally radial extent which are utilized in connection with other elements of the valve in a manner to be hereinafter described. To the left of bore 11 as viewed in the drawing are counterbores 20, 21 and 22 of progressively increasing diameters which form shoulders or abutments 23, 24 and 25.

Within bore 11 and extending to either side into adjacent counterbores 12 and 20 is a sleeve 26 having a land 27 relatively closely fitted into bore 11 and sealed with respect thereto by an O ring 28 retained in a peripheral groove 29 formed in sleeve 26. Said sleeve 26 is mounted on a bushing 30 which is mounted on a pin 31 extending almost entirely through body 10. To the left of sleeve 26 on bushing 30, as viewed in the drawing, is a valve ring 32 having a frusto-conical valve surface 33. On the opposite side of sleeve 26 is a second valve ring 34 having a frusto-conical valve surface 35. A spacer sleeve 36 is disposed over bushing 30 between valve ring 34 and the end surface 37 of a stop 38 which has a radially inward extending flange 39 retained on pin 31 between sleeve 36 and the flanged end 40 of pin 31. Valve ring 32, sleeve 26, valve ring 34, spacer sleeve 36 and flange 39 are compressed together and against flanged end 40 of pin 31 by a nut 41 on the threaded end 42 of pin 31.

A passage 69 in valve body 10 serves to conduct fluid under pressure to ball check valves 43, 44 disposed in bores 45 and 46 the axes of which intersect passage 69 and are substantially at right angles with the axis of pin 31 on either side of bore 11 in counterbores 12 and 20. Thus when ball 43 is unseated (by a means hereinafter to be described) fluid under pressure from passage 69 will be conducted around ball 43 into counterbore 20; and when ball 44 is unseated, fluid under pressure from passage 69 will be conducted around ball 44 into counterbore 12. Said counterbore 12 has an outlet 70 connected with one side of a double-acting work cylinder shown schematicially at 71, and counterbore 20 has an outlet 47 connected with the opposite side of the said cylinder. Counterbores 14 and 21 are continuously vented through outlet passages 48 and 49 which may be connected together in valve body 10 so that but one outlet or vent connection 50 to the exterior is required.

It may be observed from the description thus far given that ball check valves 43 and 44 are so disposed relative to the inlet passage 69 that whenever fluid under pressure is present in said passage, it will help to seat the balls rather than to unseat them. To admit fluid to the valve and thence to the cylinder it is necessary to unseat one or the other of the balls by a positively controlled means associated with the steering mechanism. This unseating means comprises a pair of substantially identical sleeves 51 and 52 provided with radially outwardly extending flanges 53 and 54, respectively. The sleeves themselves are slidably retained in counterbores 20 and 12, respectively, while the flanges thereof extend outwardly into counterbores 21 and 13, respectively. Axial reciprocation within counterbores 20 and 12, respectively, is limited by shoulders 24 and 17 on the one hand and by snap rings 55 and 56, respectively, on the other. Sleeve 51 is continuously urged against snap ring 55 by a wave spring 72, and sleeve 52 is continuously urged against snap ring 56 by a wave spring 73.

The adjacent ends of the sleeves 51 and 52 are chamfered as at 57 and 58, and balls 43 and 44 are so disposed relative to their seats that each projects a slight distance into its corresponding counterbore 20 and 12, respectively. When sleeve 51 or 52 is moved axially toward shoulder 23 or 16, respectively, the chamfered surface of the sleeve will contact the protruding portion of a ball and will then cam the ball upwardly off its seat to permit fluid to flow therearound. Such fluid then flows into counterbore 20 or 12 as the case may be, and then outwardly through the outlet passages 47 or 70 to cylinder 71.

Inasmuch as the two sides of work cylinder 71 are mutually exclusively operable, it is necessary to seal off the side which is to receive the fluid under pressure while opening the opposite side to a vent passage and vented counterbore. Furthermore, it is necessary that the side of the cylinder 71 which is to receive the fluid under pressure be sealed before the fluid under pressure is actually admitted. The present design is such that the sleeves 51 and 52 will not move into ball unseating positions until a seal has been effected between them and a valve ring 32 or 34. Thus, sleeve 51 is provided with a frusto-conical surface 59 adapted to be contacted by surface 33 on valve ring 32 to form a seal therebetween, and sleeve 52 is formed with a frusto-conical surface 60 which is adapted to be contacted by frusto-conical surface 35 on valve ring 34 to form a seal therebetween. It may be observed, however, that snap rings 55 and 56 are so disposed in their respective counterbores 21 and 13, respectively, as to hold sleeves 51 and 52 with their frusto-conical surfaces 59 and 60, respectively, removed from frusto-conical surfaces 33 and 35 on valve rings 32 and 34, respectively, when land 27 is centered with respect to shoulders 16 and 23 of the valve body 10. Thus, when valve ring 32, for example, is moved to the right as viewed in the drawing into contact with frusto-conical surface 59, frusto-conical surface 35 of valve ring 34 is still farther removed from surface 60, and hence the counterbore 13 as well as the interior of sleeve 52 are vented into counterbore 14. Continued movement of valve ring 32 to the right as viewed in the drawing causes cam surface 57 to unseat ball 43 and to allow fluid under pressure to enter counterbore 20 and thence through outlet 47 to the left-hand side of cylinder 71 as viewed in the drawing. Simultaneously, the opposite side of the cylinder is vented through the interior of sleeve 52 as previously stated. The same sequence of operations may be effected by movement of valve ring 34 to the left as viewed in the drawing, to seal off outlet passage 70 from the vented counterbore 14 and then to unseat ball 44 to admit fluid under pressure to counterbore 12 and thence through the outlet 70 to the right-hand side of the cylinder 71 as viewed in the drawing.

Valve rings 32 and 34 are held in normally spaced relation with sleeves 51 and 52 by a centering device of known construction and comprising a spring 61 compressed between spaced washers 62 and 63 which are confined between shoulder 18 and a fixed ring 64 held against axial movement to the left as viewed in the drawing by shoulder 19 and to the right by a snap ring 65. The radially inner regions of the spaced washers abut on the one hand against the valve ring 34 and on the other against a shoulder 66 on sleeve 36. Thus, when the stop member 38 is moved to the right or left as viewed in the drawing in response to steering effort on the part of the vehicle driver, such movement will be resisted by the additional compression of spring 61 and the reaction thereof against whichever washer 62 or 63 is moved with the sleeve 36, and upon the relaxation of the steering force, the spring 61 will restore sleeve 36 and its associated valve rings 32 and 34 to their normal spaced relation with respect to sleeves 51 and 52.

It may be mentioned that a cap 67 is inserted in counterbore 22 and held against shoulder 25 by a snap ring 68. It may be stated further that appropriate seals of the O-ring type, such as ring 28 in groove 29, are used throughout the valve mechanism wherever it may be desirable or necessary to have a fluid-tight seal. The construction and location of such seals is believed to be within the skill of the art and hence are not described herein in detail. The use of such seals, however, makes it possible to eliminate close machining and lapping of cylindrical parts and hence is a major factor in reducing the cost of the valve mechanism as a whole. The construction of the ball check valves 43 and 44, of course, likewise requires no close machining or lapping and hence the construction of the valve as a whole may be effected by simple well-known machine operations, such as may be produced by screw machines, turret lathes or the like.

It may be observed that when either valve ring 32 or 34 contacts its sleeve 51 or 52, respectively, and fluid under pressure is admitted into the counterbore for that sleeve, the pressure will be exerted axially as well as radially. Thus the pressure will act against the sloping sides of the land 27 as well as against the frusto-conical valve surface 33 or 35. Assuming for purposes of illustration that the valve has been shifted to the left as viewed in the drawing, frusto-conical surface 35 will be in contact with the corresponding surface 60 of sleeve 52 and sleeve 52 will then in effect become a part of valve ring 34 and the sleeves and parts associated therewith. The effective diameter of the movable valve part toward the right will therefore be the outside diameter of sleeve 52 (excluding flange 54 from consideration) while the effective diameter of the movable valve part toward the left will be the diameter of land 27. These diameters are unequal and hence unequal hydraulic pressures will be exerted on the movable valve part in opposite directions, the greater force being exerted toward the right and producing a resistance in the steering mechanism approximating that experienced in a purely mechanical system.

The hydraulic forces are likewise unbalanced when the movable valve parts are shifted to the right as viewed in the drawings, that is, the effective diameters are the outside diameter of sleeve 51 (excluding flange 53 from consideration) and the outside diameter of land 27, the greater force being exerted toward the left and producing likewise a resistance in the steering mechanism.

Since the total pressure produced by a double acting piston on the side having the piston rod is less than on the side opposite the rod, for uniform movement, the unit pressure must be increased on the rod side of the piston over that on the opposite side. For this reason the diameters of bores 12 and 20 are made different, with bore 20 being the smaller so that the pressure on the piston rod side associated with bore 20 may build up to a higher value for the same total pressure on the movable valve parts.

In the event of a power failure and a consequent complete absence of pressure fluid at the inlet passage 69, any effort to operate the steering linkage (not shown) by manual means alone will result in a corresponding effort to move the piston in cylinder 71. Thus when the piston is moved to the left, the movable valve parts will be moved to the left likewise, resulting in closing off the chamber to the right of land 27. Valve 44 will be opened, but the passage communicating therewith leads to a pump (not shown) which is not then operating and is sealed to the exterior. Valve 43 is held closed by its spring and is opposed only by atmospheric or vent pressure. With the chamber thus sealed, movement of the piston to the left can be accomplished only by creating a vacuum in the cylinder on what would normally be the working side of the piston. This vacuum pressure is transmitted through the linkage back to the steering wheel and becomes an undesirable resistance to steering the vehicle.

To overcome the foregoing condition, a check valve 74 is provided between the inlet passage 69 and the chamber communicating with vent passages 48 and 49. Valve 74 is normally held closed by the fluid pressure in inlet passage 69, but upon the creation of a vacuum in vent passage 69 under the conditions just described, the atmospheric pressure in vent passage 49 will open valve 74 and allow air to move freely into inlet passage 69, through valve 44 and into the chamber and passage leading to the cylinder on the side of the piston where the vacuum is being created. The free entrance of air into the cylinder removes or at least greatly reduces the resistance to steering which otherwise would be present.

The angles of the cam surfaces 57, 58 can be selected to give any desired movement of balls 43, 44 and hence the cams and the inherent characteristic of ball valves of producing a graduated flow makes possible a precise control of the rate of flow of the fluid into the cylinder 71 and the elimination of an abrupt application of auxiliary steering force to the steering system.

It is understood that the foregoing description is illustrative of a preferred embodiment of the invention and that the scope of the invention is not to be limited thereto but is to be determined by the appended claims.

I claim:

1. A valve comprising a valve body having substantially longitudinally disposed inlet and vent passages and a bore, a control member reciprocable in the bore and dividing the bore into two chambers, said valve body having cross bores intersecting the inlet passage and opening upon the first mentioned bore, fluid pressure operated valves in the cross bores, and means operated by the control member for mutually exclusively opening the fluid pressure operated valves against the action of the fluid pressure, said chambers being so disposed that a fluid pressure valve is disposed in each chamber, said valve body having further passageways connecting each chamber with the vent passage, and means for closing a chamber to the vent passage when the fluid pressure valve for that chamber is open.

2. A valve as described in claim 1, said means operated by the control member comprising axially reciprocable sleeves each having means at one end for contacting a valve to open said valve, and the means for closing a chamber to the vent passage comprising a valve part on the other end of said sleeve, and a valve part on the control member contacted by the said valve part on the sleeve, and means for sealing the sleeves with respect to the valve body.

3. A valve as described in claim 1, said means operated by the control member comprising axially reciprocable sleeves each having means at one end for contacting a valve to open said valve, a flange at the other end of each sleeve, said valve body being counterbored to receive the sleeve flanges, resilient means urging the sleeve away from the valve contacted thereby, stop means limiting movement of the sleeve by the said resilient means, and means for sealing the sleeve with respect to the valve body; and the means for closing a chamber to the vent passage comprising a valve part on the other end of said sleeve, and a valve part on the control member contacted by the said valve part on the sleeve.

4. A valve as described in claim 1, said means operated by the control member comprising sleeves axially reciprocable in bores in the valve body each sleeve being sealed with respect to the valve body and having means at one end for contacting a valve to open said valve, and the means for closing a chamber to the vent passage comprising a valve part on the other end of said sleeve and a valve part on the control member contacted by the said valve part on the sleeve, the sleeve bores being of different diameter to provide different total pressures against the sleeve and control member.

5. A valve as described in claim 1, and a check valve interposed between the vent and inlet passages to establish communication therebetween when the pressure in the vent passage exceeds the pressure in the inlet passage.

References Cited in the file of this patent

UNITED STATES PATENTS

| 2,282,490 | Martin | May 12, 1942 |
| 2,363,235 | Ellinwood | Nov. 21, 1944 |
| 2,366,693 | Benaway | Jan. 9, 1945 |
| 2,443,809 | Terbeek | June 22, 1948 |
| 2,711,158 | Leduc | June 21, 1955 |

FOREIGN PATENTS

| 1,090,429 | France | Mar. 31, 1955 |